J. B. RUPERTS.
Cotton Seed Huller.
No. 52,321. Patented Jan'y 30, 1866.
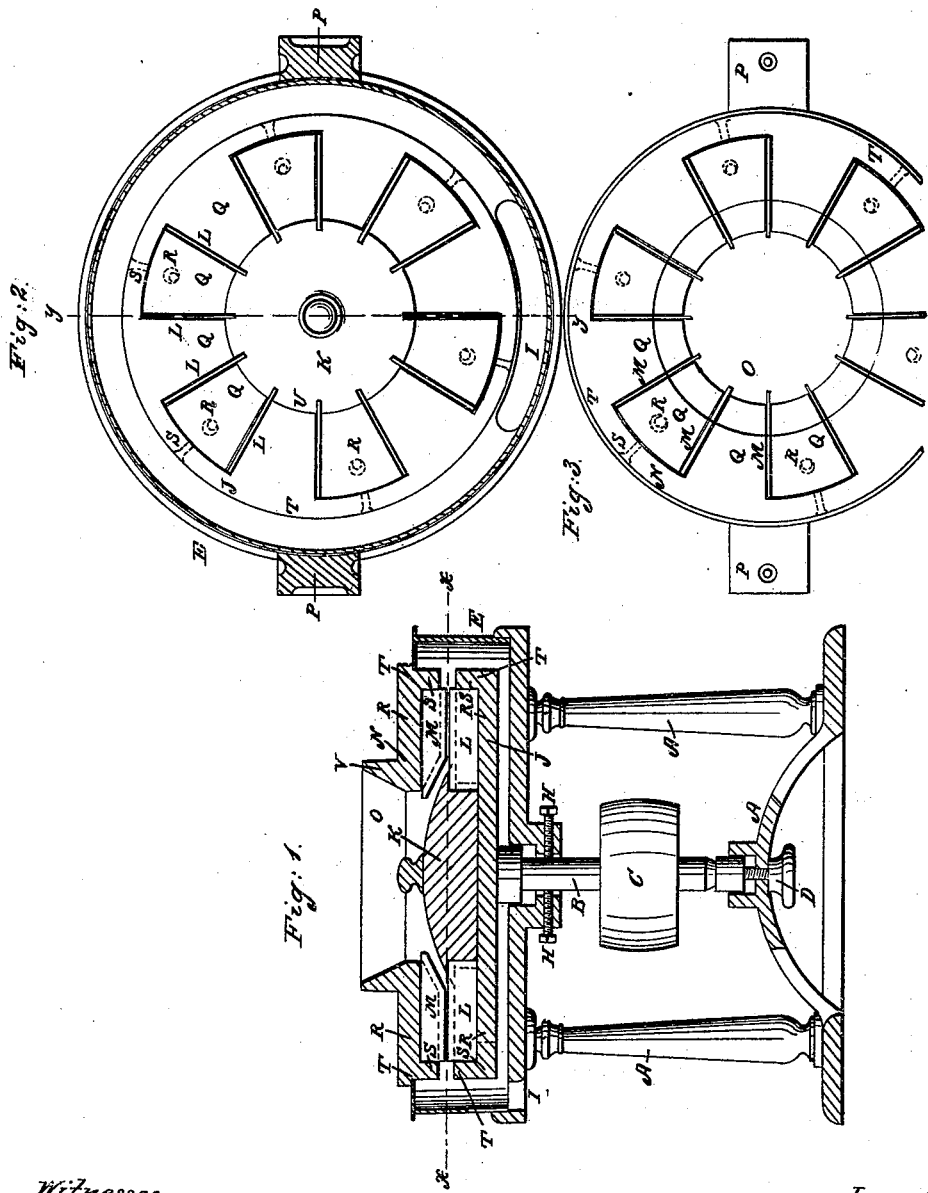

UNITED STATES PATENT OFFICE.

JOHN B. RUPERTS, OF JERSEY CITY, NEW JERSEY, ASSIGNOR TO HIMSELF, E. S. COLES, AND BUTLER COLES.

IMPROVEMENT IN MACHINES FOR HULLING COTTON-SEEDS.

Specification forming part of Letters Patent No. 52,321, dated January 30, 1866.

*To all whom it may concern:*

Be it known that I, JOHN B. RUPERTS, of Jersey City, in the county of Hudson and State of New Jersey, have invented a new and useful Improvement in Machines for Hulling Cotton and other Seeds; and I do hereby declare that the following is a full, clear, and exact description thereof, which will enable those skilled in the art to make and use the same, reference being had to the accompanying drawings, forming part of this specification, in which—

Figure is an elevation of a vertical section of a machine or mill made according to my invention, the plane of section being seen at $y$, Fig. 2. Fig. 2 is a top view of a horizontal section in the plane indicated by the line $x$ of Fig. 1. Fig. 3 is an inverted view of the upper part, N, of the mill.

Similar letters of reference indicate corresponding parts.

The object of this invention is to improve the methods and machinery heretofore used for removing the hulls or skins from cotton and other seeds so as to preserve the kernel from being crushed and broken in the process.

It consists, among other things, in the construction and manner of arranging the knives which act on the hulls and which remove them from the body of the seed.

The machine or mill has an upper and an under series of knives set in horizontal beds, one of which is revolved while the other remains stationary. The knives consist of thin blades or pieces of steel plate or sheet-steel, secured between metallic segments, which are adjustable in lines that converge toward the centers of their beds so as to hold the blades firmly.

The seed to be cleaned and hulled is fed centrally through the upper bed, which has a central opening through it for that purpose.

In order to obtain in the greatest possible degree the oils and nutritious matters which exist in the seeds of the cotton-plant and other oleaginous seeds, it is necessary to remove the hulls before putting them into the press, both for the purpose of getting out the oils in a pure state, and of keeping the farinaceous part of the seed from being injured and deteriorated by the presence of the hulls and of foreign matters, such farinaceous part being useful as food for stock.

The letter A designates the standards and supporting-frame of a machine or mill which I have made in order to illustrate the principle of my invention.

B is a vertical shaft, stepped in a socket in the lower part of the frame A, and made adjustable therein by means of an adjusting screw, D, or by any other convenient device. The shaft has a pulley, C, to receive a belt from a driving-pulley. (Not shown.)

The standards A support a bed, F, of circular form, on the under side of which is a central collar, G, through which the shaft passes. The collar has three or more adjusting-screws, H, passing through it in radial directions, which serve to center the shaft.

The bed F has a circumferential flange or rim, within which is placed an inclosing-ring, E, as shown in Figs. 1 and 2.

J is a bed-plate, of circular form, fixed upon the top of the shaft. It has a rim, T, raised upon its circumference within which are arranged radially a series of steel blades, L, and a series of segmental blocks, Q, between the several blades.

The blades Q, or each alternate one, as in this example, is connected to the bed-plate J by means of set-screws R, which screw into the bed-plate from below, being received into elongated holes to permit them to move in radial directions with the blocks. The blocks are made adjustable in radial directions, or, as in this example, the alternate ones are made adjustable by screws S, which work through the flange or rim T of the bed-plate against the outer ends of the blocks. The blades are longer than the blocks and exceed them somewhat in width, as seen in Fig. 1, where the blades are shown resting on the bed-plate, their inner ends extending into the periphery of a center piece, K, which has a flange, U, around its upper edge extending outward and overlapping the space left between its circumference and the inner ends of the segmental blocks. The upper side of the center piece is convex and has a button or head by means of which it can be raised out of its place and be inserted again. By this mode of constructing and arranging the blocks Q, I am enabled to tighten the knives or blades L as occasion requires.

When the shaft B is rotated the bed J and its blades are rotated with it.

N is a fixed plate set above the one just described. It is seen inverted in Fig. 3. When it is in place above the bed-plate J it is secured by means of ears or lugs P, which are screwed fast to like lugs P that rise from the bed F of the frame. The plate N has, likewise, a circumferential rim or flange, T, that extends downward toward the flange T of the lower bed-plate J. Its center is open, as indicated at O, and has a flange, V, that rises around the opening to any suitable height, so as to form a hopper through which the seed to be operated upon is received into the machine.

The upper plate, N, has radial blades or knives M, held in place by segmental blocks Q, as in the case of the bed-plate J, which blocks, or each alternate one, are secured to the plate by screws R, working in radial slots, and are made capable of being forced inward by means of screws S that work in the rim T. The shape of the knives M differs from the shape of the knives L in having their inner parts angular so as to clear the center piece, K.

The diameters of the bed-plate J and upper plate N are less than that of the inclosing-case E, so that an annular space is left between them, which space is covered by extending the case inwardly from its upper edge to meet the flange or rim T.

The bed-plate J is raised above the bed F of the frame more or less, according to its adjustment with respect to the face of the plate N, and the space below said bed-plate J may be left open, as here shown, or, if desired, may be inclosed by a ring.

An opening, I, is made through the bed F at one side through which whatever is received through the hopper is discharged.

The knives M L are simply pieces of sheet-steel or steel-plate, not sharpened or otherwise prepared. The extent of the cutting-surfaces of the blades M exposed above the blocks Q is determined by the position of the blocks, and in both plates the knives are tightened by forcing the blocks farther inward. When the knives are drilled by running a long time in one direction, the rotation of the bed-plate J is reversed, when the knives will be found to act with efficiency without requiring that they be removed to be sharpened or repaired. As the knives wear down it is only necessary to raise them a little ways, so that their edges will be at the required distance above the surfaces of the blocks or wedges, in which position they will be held by the blocks which clamp the knives more or less tightly, according as the screws S drive them inward, and consequently the knives can continue to be used so long as they are wide enough to be held along their lower edges by the blocks.

It will be observed, therefore, that it is not necessary that the lower edges of the knives rest on the beds or plates J and N, but that thay will be at all times held securely between the blocks or wedges so long as their blades are wide enough to be clamped between them.

In operating the machine, cotton or other seeds is delivered freely into it through the hopper, and rapid motion being given to the shaft, the seed will be subjected to a brisk abrasion and rubbing action between the knives L and M, and will be continually carried, by centrifugal action, toward the circumference of the plates passing into the annular space next the case E, and eventually out of the machine through the discharge-opening I. When they have passed from between the plates they will be found stripped of their hulls without having been bruised or crushed, or much broken. The kernels or farinaceous parts of the seed are next separated from the hulls and other matters, such as cotton-fibers, which accompany the seed, and are then pressed or crushed in any proper way to obtain the oil which is contained therein, while the cotton and hulls are removed to be treated like paper-stock for being reduced to pulp and afterward to be made into paper.

I have shown the knives arranged in horizontal planes, but they may be made to act in vertical planes, if desired, with the same result. The beds or plates on which the knives are placed are here shown made with plane surfaces, only for the purpose of illustrating the principle of my invention; but they may be made conical or cylindrical, or of any other convenient or desired form, the form of the segmental blocks or wedges and the contour of the knives being, in such cases, made to conform to such alterations in the form of the beds or plates which hold them.

It will be observed that I have in this invention avoided weakening the knives by perforating them in order to fasten them in the machine, and that when their edges become dull it is only necessary to reverse the motion of the mill in order to reset their edges, thereby making them to sharpen each other automatically.

The rounded or convex top of the central piece, K, will prevent the seed from lodging at that part of the mill, and such top may have a conical shape, if desired.

I claim as new and desire to secure by Letters Patent—

1. The blades or knives, as described, in combination with a series of segmental blocks interposed between them so as to hold the latter in place, and adjustable in radial directions, substantially as set forth.

2. Placing the central block, K, on the bed-plate J, when the same has a flange, U, projecting over the inner ends of the blocks Q and when its top is made convex, substantially as described.

The above specification of my invention signed by me this 8th day of November, 1865.

JOHN B. RUPERTS.

Witnesses:
M. M. LIVINGSTON,
C. L. TOPLIFF.